(12) United States Patent
Webman et al.

(10) Patent No.: US 7,925,629 B2
(45) Date of Patent: Apr. 12, 2011

(54) WRITE ORDERING STYLE ASYNCHRONOUS REPLICATION UTILIZING A LOOSELY-ACCURATE GLOBAL CLOCK

(75) Inventors: Erez Webman, Petach-Tikva (IL); Yoram Novick, Cupertino, CA (US); Dvir Koren, Ramat-Ishay (IL)

(73) Assignee: NetApp, Inc., Sunnyvale, CA (US)

( * ) Notice: Subject to any disclaimer, the term of this patent is extended or adjusted under 35 U.S.C. 154(b) by 290 days.

(21) Appl. No.: 11/692,668

(22) Filed: Mar. 28, 2007

(65) Prior Publication Data
US 2008/0243951 A1 Oct. 2, 2008

(51) Int. Cl.
G06F 7/00 (2006.01)
G06F 17/00 (2006.01)

(52) U.S. Cl. ......... 707/648; 707/649; 707/682; 707/959

(58) Field of Classification Search ............ 707/204
See application file for complete search history.

(56) References Cited

U.S. PATENT DOCUMENTS

| | | | |
|---|---|---|---|
| 5,504,861 A | 4/1996 | Crockett et al. | |
| 5,592,618 A | 1/1997 | Micka et al. | |
| 5,657,440 A | 8/1997 | Micka et al. | |
| 5,682,513 A * | 10/1997 | Candelaria et al. | 711/113 |
| 6,144,999 A | 11/2000 | Khalidi et al. | |
| 6,502,205 B1 | 12/2002 | Yanai et al. | |
| 7,152,077 B2 * | 12/2006 | Veitch et al. | 707/203 |
| 7,152,120 B2 * | 12/2006 | Yamagami | 707/999.204 |
| 7,203,732 B2 | 4/2007 | McCabe et al. | |
| 7,467,265 B1 | 12/2008 | Tawri et al. | |
| 7,571,268 B2 | 8/2009 | Kern et al. | |
| 7,624,109 B2 | 11/2009 | Testardi | |
| 2002/0039370 A1 * | 4/2002 | Elliot | 370/503 |
| 2003/0177154 A1 * | 9/2003 | Vrancic | 708/160 |
| 2003/0204692 A1 | 10/2003 | Tamer et al. | |
| 2004/0139367 A1 * | 7/2004 | Boyd et al. | 714/7 |
| 2004/0250029 A1 | 12/2004 | Ji et al. | |
| 2004/0260736 A1 * | 12/2004 | Kern et al. | 707/204 |
| 2005/0071708 A1 | 3/2005 | Bartfai et al. | |
| 2005/0144202 A1 * | 6/2005 | Chen | 707/205 |
| 2005/0154786 A1 | 7/2005 | Shackelford | |

(Continued)

FOREIGN PATENT DOCUMENTS
EP 1617330 A2 1/2006

OTHER PUBLICATIONS

Mills, David L., "Network Time Protocol (version 3) Specification, Implementation and Analysis," Network Working Group, XP002935527, Mar. 1, 1992, pp. i-vii and 1-113.

(Continued)

*Primary Examiner* — Yicun Wu
*Assistant Examiner* — Kannan Shanmugasundaram
(74) *Attorney, Agent, or Firm* — Cesari and McKenna, LLP

(57) ABSTRACT

A write ordering style asynchronous replication service utilizes a loosely-accurate global clock in a data backup and recovery storage environment. The storage environment includes a set of source storage systems illustratively embodied as source replication nodes that cooperate to maintain a consistency group that may span multiple geographical sites. The storage environment also includes one or more target storage systems illustratively embodied as target replication nodes configured to service the consistency group. The write ordering style service utilizes the loosely-accurate global clock to provide consistent replication of a storage space of the consistency group.

30 Claims, 7 Drawing Sheets

U.S. PATENT DOCUMENTS

| | | | |
|---|---|---|---|
| 2006/0015507 A1* | 1/2006 | Butterworth et al. | 707/10 |
| 2006/0059322 A1* | 3/2006 | Poston | 711/162 |
| 2007/0022264 A1 | 1/2007 | Bromling et al. | |
| 2007/0165549 A1 | 7/2007 | Surek et al. | |
| 2007/0239950 A1 | 10/2007 | Kern et al. | |
| 2008/0162594 A1* | 7/2008 | Poston | 707/202 |
| 2008/0243952 A1 | 10/2008 | Webman et al. | |

OTHER PUBLICATIONS

"Notification of Transmittal of the International Search Report and the Written Opinion of the International Searching Authority, or the Declaration," International Filing Date: Mar. 19, 2008, International Application No. PCT/US2008/003612, Applicant: Network Appliance, Inc., Date of Mailing: Nov. 5, 2008, pp. 1-17.

"Notification of Transmittal of the International Search Report and the Written Opinion of the International Searching Authority, or the Declaration," International Filing Date: Mar. 19, 2008, International Application No. PCT/US2008/003554, Applicant: Network Appliance, Inc., Date of Mailing: Aug. 26, 2008, pp. 1-14.

"Notification of Transmittal of the International Search Report and the Written Opinion of the International Searching Authority, or the Declaration," International Filing Date: Mar. 20, 2008, International Application No. PCT/US2008/003692, Applicant: Network Appliance, Inc., Date of Mailing: Nov. 5, 2008, pp. 1-17.

* cited by examiner

WRITE ORDERING STYLE ASYNCHRONOUS REPLICATION UTILIZING A LOOSELY-ACCURATE GLOBAL CLOCK

CROSS-REFERENCE TO RELATED APPLICATION

The present invention is related to the following commonly assigned U.S. patent application Ser. No. 11/692,659 titled, Advanced Clock Synchronization Technique and U.S. patent application Ser. No. 11/692,683 titled, Group Stamping Style Asynchronous Replication Utilizing a Loosely-Accurate Global Clock, each of which is filed herewith.

FIELD OF THE INVENTION

The present invention relates to replication services and, more specifically, to a write ordering style asynchronous replication service utilizing a loosely-accurate global clock.

BACKGROUND OF THE INVENTION

Replication is typically employed as part of a data backup and recovery storage strategy and, as such, denotes the movement of data from a source storage space of a source domain to a target storage space of a target domain via a communications network (e.g., a computer network) in such a way that enables recovery of applications from the target storage space. As used herein, recovery denotes loading of the applications on possibly different hosts (e.g., computers) where they can access the target storage space, instead of the source storage space, resulting in the applications loaded to a valid state. Also, storage space denotes any storage medium having addresses that enable data to be accessed in a stable way and, as such, may apply to file system access, block access and any other storage access means.

The source domain contains at least the source storage space, but may also contain the hosts, a switching fabric and any source replication components situated outside of those components. In this context, a component may either be a physical entity (e.g., a special replication appliance) and/or software entity (e.g., a device driver). In remote disaster recovery, for example, the source domain includes an entire geographical site, but may likewise span multiple geographical sites. The target domain includes all of the remaining components relevant for replication services, including the target storage space. In addition, a replication facility includes components that may be located in both the source and target domains.

The replication facility typically has at least one component, i.e., a write interception component, which intercepts storage requests (e.g., write operations or "writes") issued by a host to the source storage space, prior to sending the intercepted writes to the target storage space. The write interception component is typically embedded within a computing unit configured as a source replication node. When issuing a write, an application executing on the host specifies an address on the storage space, as well as the contents (i.e., write data) with which the storage space address is to be set. The write interception component may be implemented in various locations in the source domain depending on the actual replication service; such implementations may include, e.g., a device driver in the host, logic in the switching fabric, and a component within the source domain, e.g., a source storage system. The write interception component is typically located "in-band", e.g., between the host and the source storage system, although there are environments in which the component may be located "out-of-band", where a separate physical component, such as an appliance server, in the source domain receives duplicate writes by utilizing, e.g., an in-band splitter.

Synchronous replication is a replication service wherein a write is not acknowledged until the write data associated with the write is processed by the source storage space, propagated to the target domain and persistently stored on the target storage space. An advantage of synchronous replication is the currency of the target domain data; that is, at any point in time, the writes stored on the target domain are identical to the source domain. However a disadvantage of this replication service is the latency or propagation delay associated with communicating the writes to the target domain, which limits the synchronous replication service in terms of distance, performance and scalability.

An asynchronous replication service reduces such latency by requiring that the write only be processed by the source storage space without having to wait for persistent storage of the write on the target storage space. In other words, the write is acknowledged once its associated write data is processed by the source storage space; afterwards, the write (and write data) are propagated to the target domain. Thus, this replication service is not limited by distance, performance or scalability and, therefore, is often preferred over synchronous replication services. A disadvantage of the asynchronous replication service, though, is the possibility of incurring data loss should the source storage space fail before the write data has been propagated and stored on the target storage space.

Prior asynchronous replication services may be classified into a plurality of techniques or styles, one of which is write ordering. According to this replication style, the write interception component intercepts all writes (e.g., synchronously before an acknowledgement is returned to the application), buffers the intercepted writes and associates metadata with each write that reflects its relative order. The metadata may not be an actual timestamp, i.e., a monotonously-increasing number (sequence number) is sufficient. The buffered writes are then propagated to the target domain and applied in-order to the target storage space. The write interception component may alternately maintain ordering by intercepting the writes synchronously to the flow of the writes from the host to the source storage system. That is, the write interception component intercepts the writes and then transmits them to the target storage system in order.

The replication services may be further adapted to planned recovery or unplanned recovery. Planned recovery is defined herein as an act of recovery where components, e.g., hardware and software, of the source domain are fully operational, whereas unplanned recovery is defined as recovery that takes place when the source components are fully and/or partially non-operational. As used herein, the source domain describes all of the components whose failure/unavailability should not impair the ability to do unplanned recovery.

For unplanned recovery services, the writes may be propagated to the target domain without applying them directly to the target storage space to thereby ensure consistency in light of an intervening disaster. Accordingly, the writes are propagated to an intermediate staging area on the target domain before they are applied to the target storage space to ensure that the storage space can be "rolled back" to a consistent state if a disaster occurs. The replication services may utilize various intermediate staging areas (such as a persistent log or non-volatile memory) to buffer the writes in a safe and reliable manner on the target domain.

Often, a source domain having multiple hosts and/or multiple source storage systems may include only one source replication node (i.e., one write interception component) configured to intercept all writes associated with a consistency group. As used herein, a consistency group comprises storage space that requires consistent replication at a target domain. An advantage of such a configuration employing a write ordering replication service is the relative ease with which the writes can be ordered and consistent replication guaranteed. However, this configuration introduces a scalability issue because there is a limit to the processing bandwidth that the interception component can sustain, thereby resulting in potentially substantial adverse impact on performance of the entire configuration. Thus, this configuration may obviate use of a single write interception component.

For example, assume that a large data center is configured with many source storage systems configured to serve many hosts, wherein the source storage systems cooperate to maintain a consistency group. If all write traffic is directed to the single write interception component, a substantial scalability issue arises because the interception component will not practically be able to sustain the entire traffic. Now assume that a consistency group is configured to span multiple geographical site locations such as, e.g., among several small data centers geographically dispersed throughout a country or a plurality of countries. Here, the main reason for not using a single write interception component is not necessarily the scalability issue as much as the substantial latency introduced by such a configuration. This may necessitate either use of smaller consistency groups, which facilitates reliable and consistent group recovery on the target domain, or acceptance of large latencies and performance impact, which is undesirable. Therefore, such configurations may dictate the use of multiple write interception components.

Yet, prior write ordering style, asynchronous replication solutions have been generally unable to accommodate configurations employing multiple write interception components. A possible exception is the XRC Asynchronous Replication service available from IBM Corporation, which ensures write ordering among multiple write interception components through the use of a fine grained, extremely accurate, hardware-based global clock facility. The XRC service uses a dedicated, hardware mechanism to realize such an accurate global clock and, as such, is generally tailored to mainframe computers. That is, the ability to set a time that is extremely accurate is guaranteed by the hardware mechanism built into mainframe technology. Such a mechanism is expensive and generally not is deployable by systems running open, general-purpose operating systems. Furthermore, such mainframe technology may not be practically deployed in distributed environments because of latency issues, thereby rendering the hardware mechanism ineffective when servicing a consistency group that spans multiple geographical sites.

SUMMARY OF THE INVENTION

The present invention overcomes the disadvantages of the prior art by providing a write ordering style asynchronous replication service that utilizes a loosely-accurate global clock in a data backup and recovery storage environment. The storage environment includes a set of source storage systems illustratively embodied as source replication nodes that cooperate to maintain a consistency group that may span multiple geographical sites. The storage environment also includes one or more target storage systems illustratively embodied as target replication nodes configured to service the consistency group. The write ordering style service utilizes the loosely-accurate global clock to provide consistent replication on a storage space, e.g., a target storage space, of the consistency group.

In an illustrative embodiment, each source replication node comprises a write interception component adapted to intercept storage requests (e.g., write operations or "writes") and replicate those writes to the target replication nodes for storage on the consistency group. Each target replication node comprises a log, a consistency engine and an apply engine. Upon intercepting a write, the write interception component of each source replication node records the intercepted write and generates metadata for the recorded write, wherein the metadata illustratively includes a Time Identifier (ID). The write interception component buffers the write, its associated write data and metadata in an entry of a buffer, and then propagates its buffered entry to the target replication node, which stores the entry as a buffered log entry in the log.

In accordance with the invention, the consistency engine is configured to establish, maintain and advance a consistency timeline. Only log entries that have an associated Time ID earlier than a current consistency timeline may be applied to the target storage space by the apply engine. The apply engine is thus configured to apply all log entries up to a given consistency timeline to thereby create a crash image on the target storage space, wherein the crash image is a storage image of the target storage space that is available at restart from an interruption, such as a power failure.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
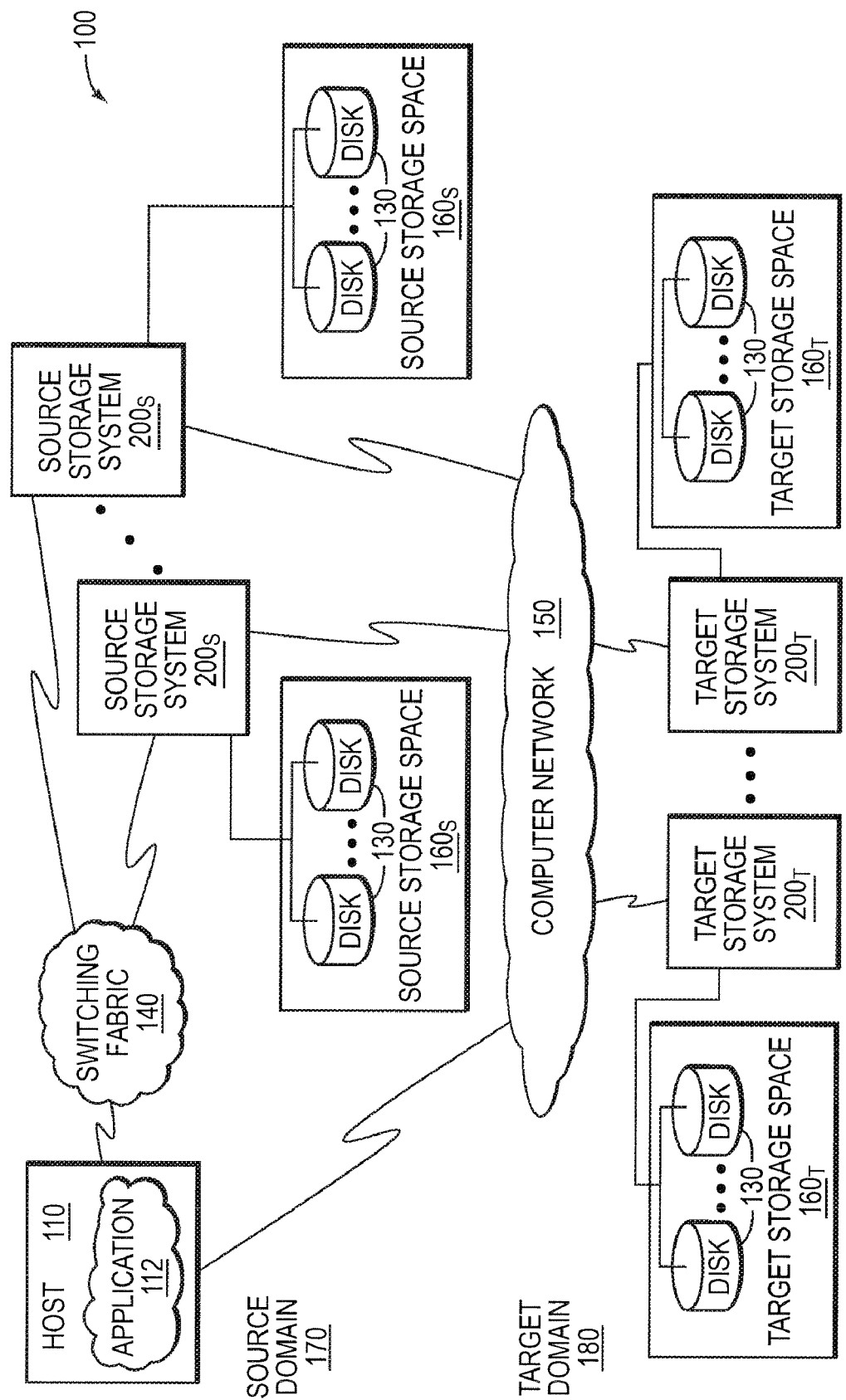
FIG. 1 is a schematic block diagram of an environment including a plurality of storage systems that may be advantageously used with the present invention.

FIG. 1 is a schematic block diagram of an environment 100, such as a data backup and recovery storage environment, which includes a plurality of storage systems 200, such as source storage systems $200_S$ and target storage systems $200_T$, that may be advantageously used with the present invention. Each storage system is a computer that provides storage service relating to the organization of information on storage devices, such as disks 130. The disks 130 of each storage system $200_{S,T}$ cooperate to define a storage space $160_{S,T}$ on each system. The source storage systems are connected to one or more hosts 110 over a switching fabric 140, which may comprise a conventional Ethernet or Fibre Channel (FC) switch.

In an illustrative embodiment described herein, the hosts 110, source storage systems $200_S$ and source storage spaces 160s are organized as components of a source domain 170, while the target storage systems $200_T$ and their target storage spaces $160_T$ are organized as components of a target domain 180. The source domain components are coupled to the target domain components over a computer network 150, which may comprise a plurality of point-to-point connections or communication links of, e.g., a wide area network embodied as an Ethernet network or a FC network. The components of each domain may communicate over network 150 by exchanging discrete frames or packets of data according to pre-defined protocols, such as the Transmission Control Protocol/Internet Protocol (TCP/IP).

Each host 110 may be a general-purpose computer configured to execute applications 112. Moreover, each host 110 may interact with each storage system 200 in accordance with a client/server model of information delivery. That is, the client (host) may request the services of the server (storage system), and the storage system may return the results of the services requested by the host, by exchanging packets over, e.g., the switching fabric 140. The hosts may issue packets including file-based access protocols, such as the Common Internet File System (CIFS) protocol or Network File System (NFS) protocol, over TCP/IP when accessing information in the form of files and directories. Alternatively, the client may issue packets including block-based access protocols, such as the Small Computer Systems Interface (SCSI) protocol encapsulated over TCP (iSCSI) and SCSI encapsulated over FC (FCP), when accessing information in the form of blocks.

Figure 2:
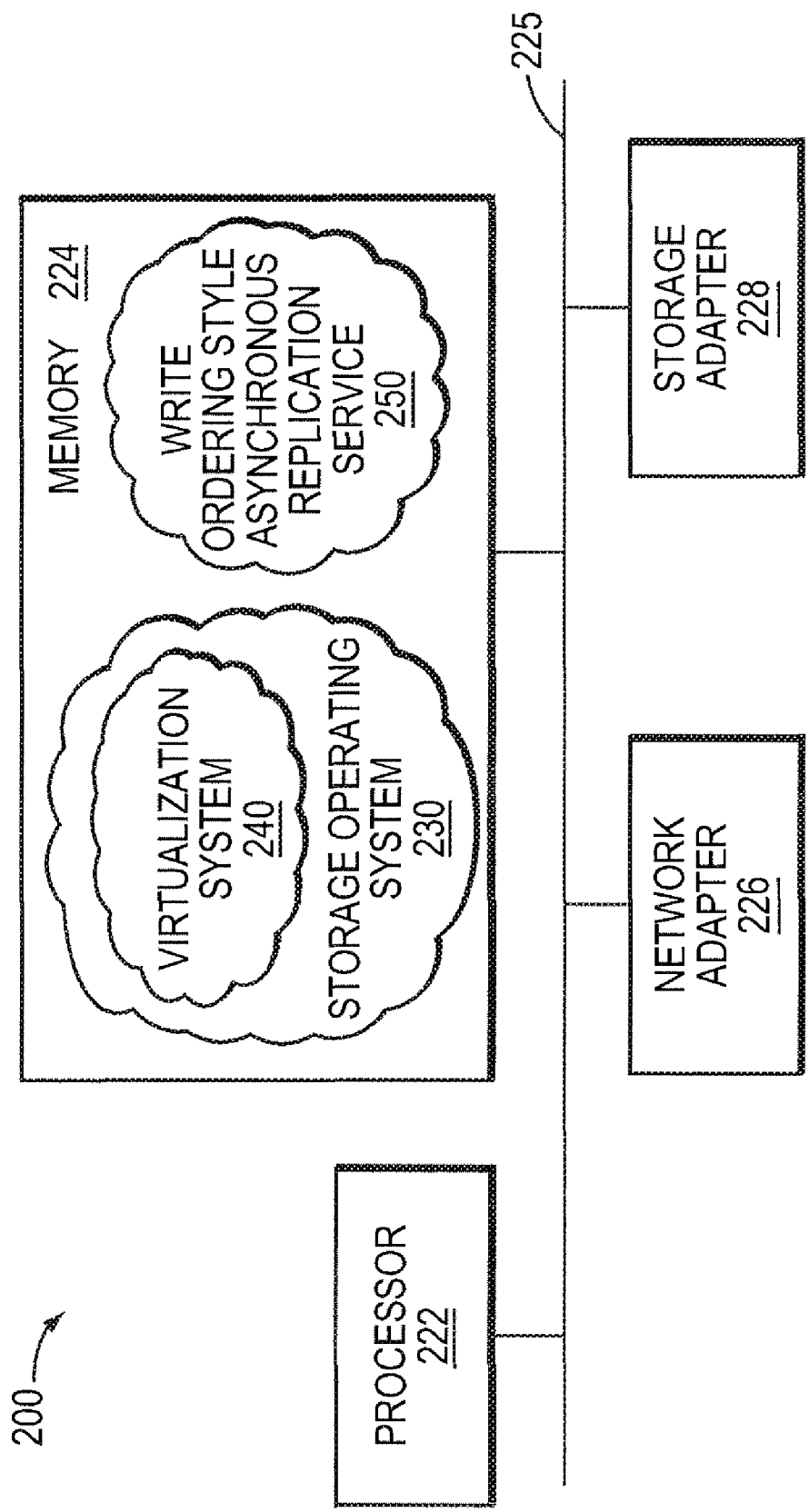
FIG. 2 is a schematic block diagram of a storage system that may be advantageously used with the present invention.

FIG. 2 is a schematic block diagram of a storage system 200 that may be advantageously used with one or more embodiments described herein as, e.g., a source storage system 200s or target storage system $200_T$. Each storage system 200 comprises a processor 222, a memory 224, a network adapter 226 and a storage adapter 228 interconnected by a system bus 225. The network adapter 226 comprises the mechanical, electrical and signaling circuitry needed to connect the storage system 200 to the switching fabric 140 or computer network 150. The storage system 200 also includes a storage operating system 230 that preferably implements a virtualization system 240 to logically organize the information as a hierarchical structure of data containers, such as directories, files and logical units (luns). The virtualization system may be abstracted through the use of a database management system, a volume manager or, as described herein, a file system.

In an illustrative embodiment, the memory 224 comprises storage locations that are addressable by the processor and adapters for storing software programs and data structures associated with the present invention. The processor and adapters may, in turn, comprise processing elements and/or logic adapted to execute the software programs and manipulate the data structures. Storage operating system 230, portions of which is typically resident in memory and executed by the processing elements, functionally organizes the system 200 by, inter alia, invoking storage operations in support of processes, modules and/or services executing on the storage system. These processes, modules and/or services may include replication services such as, e.g., write ordering style asynchronous replication service 250. It will be apparent to those skilled in the art that other processing and memory means, including various computer readable media, may be used to store and execute program instructions pertaining to the inventive technique described herein.

The storage adapter 228 cooperates with the storage operating system 230 executing on the system 200 to access information requested by a host (or user). The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, is the information is preferably stored on the disks 130. The storage adapter includes input/output (I/O) interface circuitry that couples to the disks over an I/O interconnect arrangement, such as a conventional high-performance, FC serial link topology.

Storage of information on each storage system $200_{S,T}$ is preferably implemented as a collection of physical storage disks 130 cooperating to define an overall logical arrangement of storage space $160_{S,T}$ on the system. To facilitate access to the disks 130, the storage operating system 230 implements a file system that cooperates with virtualization modules to provide virtualization system 240 that "virtualizes" the storage space 160 provided by disks 130. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization modules allow the file system to further logically organize information as a hierarchical structure of blocks on the disks that are exported as named luns.

In an illustrative embodiment, application 112 executes in host 110 to issue storage requests to access data containers exported by source storage systems $200_S$ of the source domain 170. The virtualization system 240 of each source storage system transposes the storage requests into file system requests for local storage on the source storage space 160s, to thereby serve the storage requests issued by the host 110. The storage requests are illustratively write operations ("writes"). A write interception entity or component intercepts the writes and replicates those writes to one or more target storage systems $200_T$ of the target domain 180, where the intercepted writes are stored for, e.g., data backup and/or disaster recovery purposes. The writes are thereafter consistently stored on the target storage space $160_T$ such that, if a disaster arises, the storage on that storage space can be recovered in a manner that maintains the order of writes issued to the source storage systems by the host.

The write interception component may reside (i) in the host 110 (e.g., embodied as a device driver), (ii) within the switching fabric 140 (e.g., embodied as a software is module in the network switch) or, as described herein, (iii) in the source storage system $200_S$, such that the component may intercept the writes in block-level or file-level semantics. A source replication node is the computing unit in which the write interception component is embedded. For example, if the write interception component is implemented as a device driver inside host 110, the host is the source replication node, whereas if the component is located out-of-band, i.e., within an appliance server, the appliance server is the source replication node.

An advanced clock synchronization technique is adapted for use with replication service 250 in the data backup and recovery storage environment 100. The advanced clock synchronization technique establishes a software-only, loosely-accurate global clock based on a timestamp and an associated error boundary. The established clock is a loosely-accurate global clock because, as noted, it is difficult to establish an extremely accurate, fined-grain global clock using general-purpose host systems and commercially-available storage systems, particularly if these systems are geographically dispersed. Notably, the timestamp and its error boundary are used as global clock information to enable synchronization (i.e., ordering of storage requests) among a plurality of source replication nodes, thereby ensuring consistent replication of the storage requests on the target storage systems. An example of a loosely-accurate global clock that may be advantageously used with the present invention is disclosed in commonly-assigned U.S. patent application Ser. No. 11/692,659 titled, Advanced Clock Synchronization Technique, which application is hereby incorporated by reference.

Figure 3:
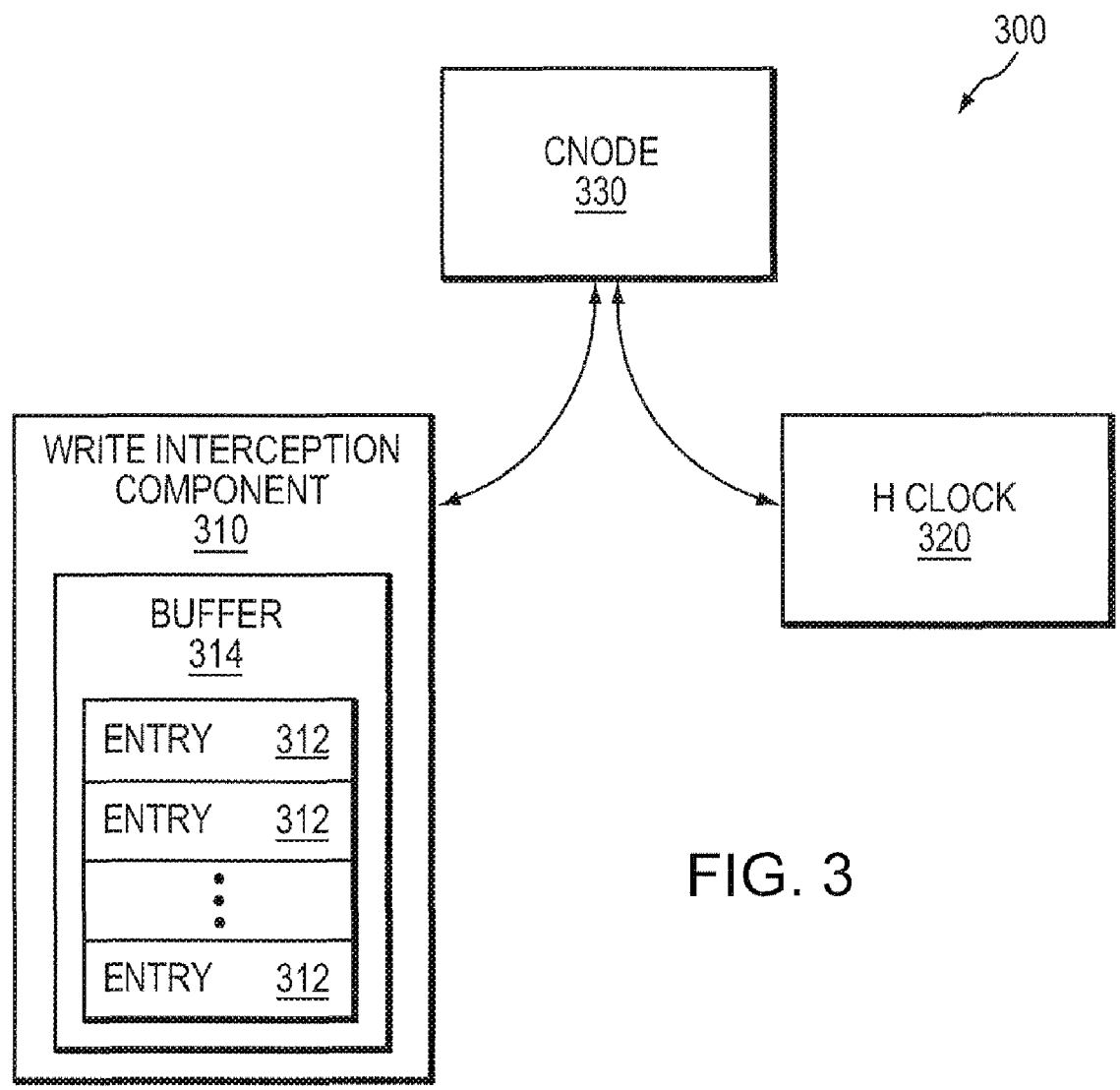
FIG. 3 is a schematic block diagram of a source replication node that may be advantageously used with the present invention.

FIG. 3 is a schematic block diagram of a source replication node 300 that may be advantageously used with the present invention. As noted, a source replication node (SRN) is the computing unit in which a write interception component is embedded. In an illustrative embodiment described herein, the write interception component 310 is located in a source storage system 200s and is embodied as a software module disposed over the virtualization system 240; as such, each source storage system 200s may illustratively be an SRN 300. Each SRN also contains a hardware clock (HClock) component 320 and a clock node (CNode) component 330.

Specifically, the HClock 320 is a conventional hardware clock circuit adapted to generate a clock or "timestamp" having a known drift as specified by a manufacturer, e.g., the timestamp drifts a predetermined number of seconds in an hour or in a day, maximum. Thus, there is an error boundary defined by the maximum drift, wherein the term "drift" denotes the time that the timestamp drifts from an actual, real time. The CNode 330 is coupled in cooperating relation to (associated with) the HClock 320 and the write interception component 310. The CNode 330 is illustratively a software module configured to interact collectively with other CNodes 330 of other SRNs 300 to maintain a global clock and to provide an interface to the write interception component 310 to retrieve the current time.

In an illustrative embodiment, a set of CNodes that maintains a global clock comprises a clock group and the CNodes of a set of SRNs that maintains a consistency group belong to the same clock group. One CNode from among the clock group assumes a role of a master (hereinafter "master SRN") and the other CNodes assume the roles of slaves (hereinafter "slave SRNs"). Selection of the master and slave SRNs may be performed using conventional techniques known to those skilled in the art. In addition, determination of when a master SRN should be replaced may be performed using well-known techniques. Although the master SRN (CNode) is illustratively described as contained within an SRN, it will be understood to those of skill in the art that the master CNode could also be contained within a separate computing unit exclusive of an SRN having write interception functionality.

The present invention is directed to a write ordering style asynchronous replication service that utilizes a loosely-accurate global clock in a data backup and recovery storage environment. The storage environment includes a set of source storage systems illustratively embodied as SRNs that cooperate to maintain a consistency group that may span multiple geographical sites. The storage environment also includes one or more target storage systems illustratively embodied as target replication nodes configured to service the consistency group. A target replication node is a computing unit that resides in a target domain and that receives all writes for the consistency group issued from one or more SRNs. The write ordering style service utilizes the loosely-accurate global clock to provide consistent replication on a storage space, e.g., a target storage space, of the consistency group.

Figure 4:
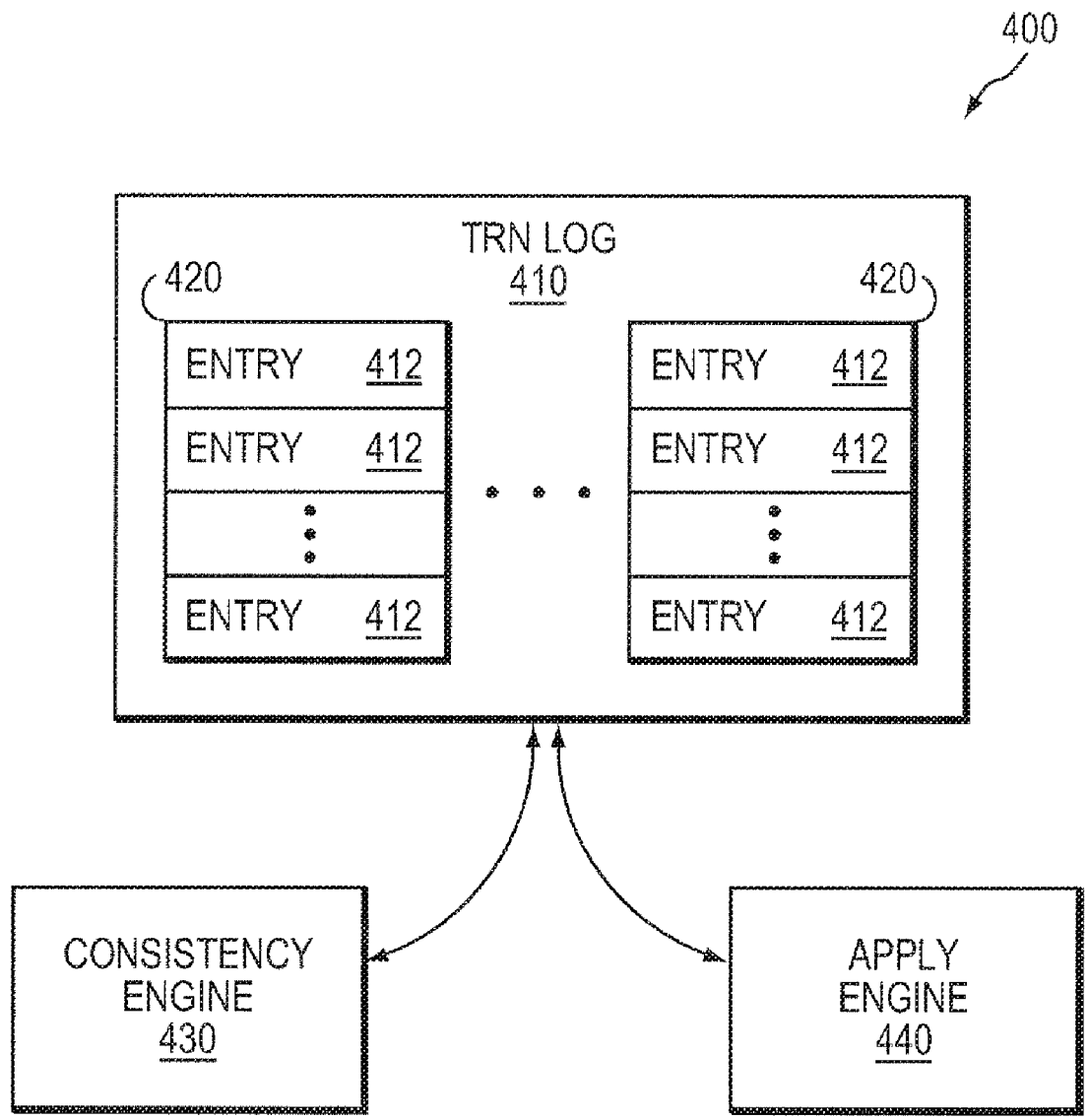
FIG. 4 is a schematic block diagram of a target replication node that may be advantageously used with the present invention.

Although an illustrative embodiment described herein is directed to a single consistency group, it will be understood to those skilled in the art that the invention may apply equally to multiple consistency groups. In addition, although the illustrative embodiment description is directed to a single computing unit, e.g., a target replication node, residing in the target domain 180 that receives all writes for the consistency group maintained by one or more SRNs, the invention applies equally to multiple target replication nodes. FIG. 4 is a schematic block diagram of a target replication node (TRN) 400 that may be advantageously used with the present invention. In an illustrative embodiment described herein, each target storage system $200_T$ may illustratively be a TRN 400. As described herein, each TRN 400 comprises a log, e.g., TRN log 410 having a plurality of log entries 412, a consistency engine 430 and an apply engine 440.

Upon intercepting a write, the write interception component 310 of each SRN 300 records the write and queries (requests) its associated CNode 330 for an indication of the current time so that it can time stamp the intercepted write. In response, the CNode 330 generates (prepares) and returns a Time Identifier (ID) data structure configured to describe the current time. The write interception component 310 generates metadata for the recorded write, wherein the metadata illustratively includes the contents of the Time ID structure, as well as an address of the write, etc. The write interception component buffers the write, its associated write data and metadata in an entry 312 of a temporary storage location organized as, e.g., a buffer 314. Note that various replication services, such as replication service 250, may implement the buffer in various ways, e.g., using volatile or non-volatile storage.

Figure 5:
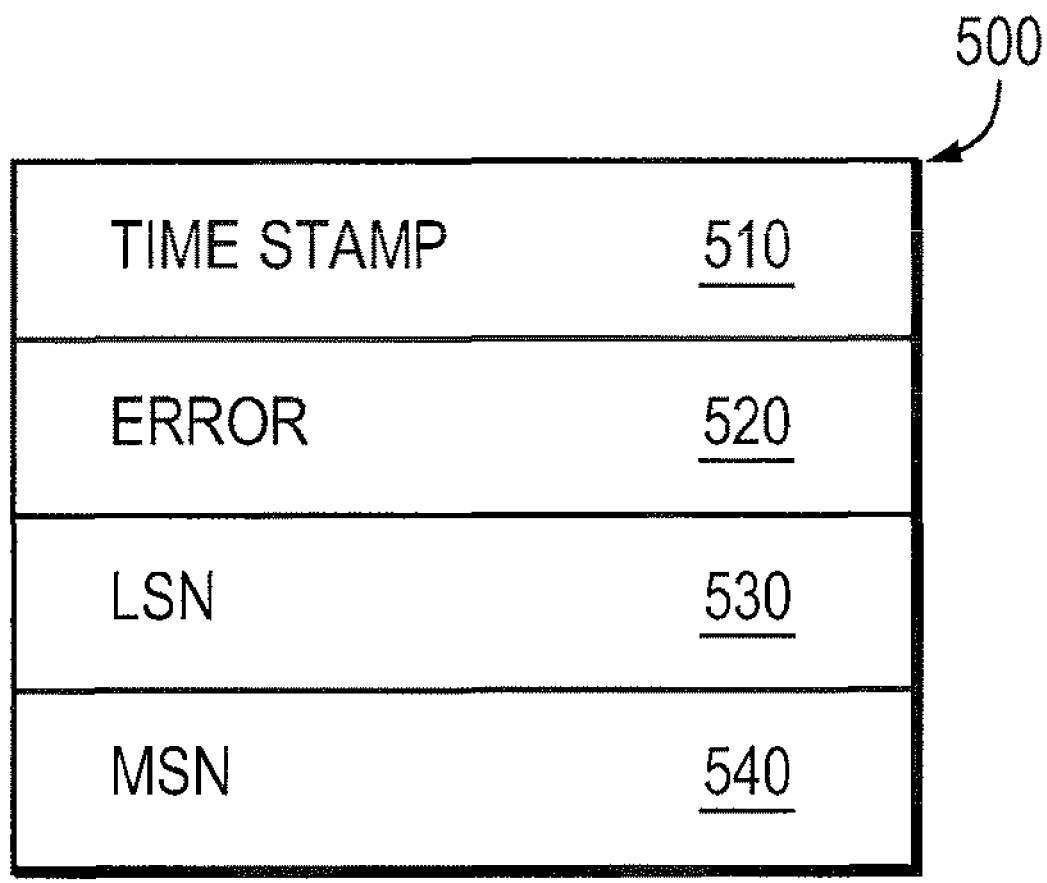
FIG. 5 is a schematic block diagram of a Time ID structure that may be advantageously used with the present invention.

FIG. 5 is a schematic block diagram of a Time ID structure 500 that may be advantageously used with the present invention. The Time ID structure 500 illustratively contains a timestamp field 510, an error field 520 (the maximum error of the timestamp), a local sequence number (LSN) field 530 and a major sequence number (MSN) field 540. The timestamp field 510 contains a timestamp, preferably chronological, with sufficient resolution (e.g., microsecond). The error field 520 contains a dynamically calculated value specifying a maximum error boundary of the timestamp. For example, assume the timestamp is t=2007, Jan 1 20:00:00:0000 and the error is 1000 (microseconds). An illustrative interpretation of the maximum error boundary is that the time may be lower or higher than the "correct" time in 500 microseconds, i.e., "real" time=[t−500 . . . t+500]. It will be understood to those skilled in the art that there may be other interpretations of the maximum error boundary such as, e.g., as "real" time=[t . . . t+1000], and those interpretations are covered by the present invention. The LSN field 530 contains a counter value that is incremented every time the CNode 330 is queried to return the current time and the MSN field 540 contains a counter value that increases in various low-frequency control events, such as master SRN replacement, master SRN restart, etc.

Each SRN 300 propagates its buffered entry 312 (the write data and its metadata) to the TRN 400, e.g., via the network, and the TRN temporarily stores (buffers) each entry as a buffered log entry 412 in the TRN log 410 prior to applying it to the target storage space $160_T$. That is, the entries 312 transmitted from all SRNs 300 are not immediately "hardened" to the target storage space $160_T$, but instead are buffered on the TRN 400. The actual data propagation and TRN buffering implementation used the replication service 250 is independent of the present invention. However, the illustrative buffering implementation should (i) enable the entries 412 buffered on the TRN to be "logically" organized as a set of data structures, such as queues 420, e.g., one queue per SRN 300, wherein each queue 420 contains the entries 412 sorted by their order of interception at the SRN, (ii) provide the TRN 400 with the ability to conclude that up to time t, there are no other entries not yet propagated by the SRN, wherein the time t is updated frequently and denoted as T-info, and (iii) provide persistent TRN buffering for disaster recovery by, e.g., embodying the TRN log 410 as a persistent storage medium (such as a disk or non-volatile memory).

In accordance with the invention, the consistency engine 430 and apply engine 440 are illustratively software processes disposed over the virtualization system 240 (i.e., on top of the block storage) of the target storage system $200_T$, although it will be apparent to those of skill in the art that the processes could also execute in the switching fabric 140 (e.g., embodied as a software module in the network switch) or in the host 110 (e.g., embodied as a device driver). The consistency engine 430 is illustratively configured to establish and maintain a value called a consistency timeline. As described herein, only TRN log entries 412 that have an associated Time ID 500 earlier than a current consistency timeline may be applied to the target storage space $160_T$ by the apply engine 440 to, e.g., ensure consistent replication in accordance with the write ordering style. The apply engine 440 is thus configured to apply all log entries 412 up to an established current consistency timeline (and no more than that), to thereby create a crash image on the target storage space. As used herein, a crash image is defined as follows: given a specific timed-sequence of writes to a storage space, e.g., the source storage space, and an initial storage image, the crash image is the storage image realized if, at time t of the storage space, an interruption (e.g., power failure) occurs. The crash image is thus a storage image of the target storage space that is available at restart from an interruption, before any further writes take place.

Figure 6:
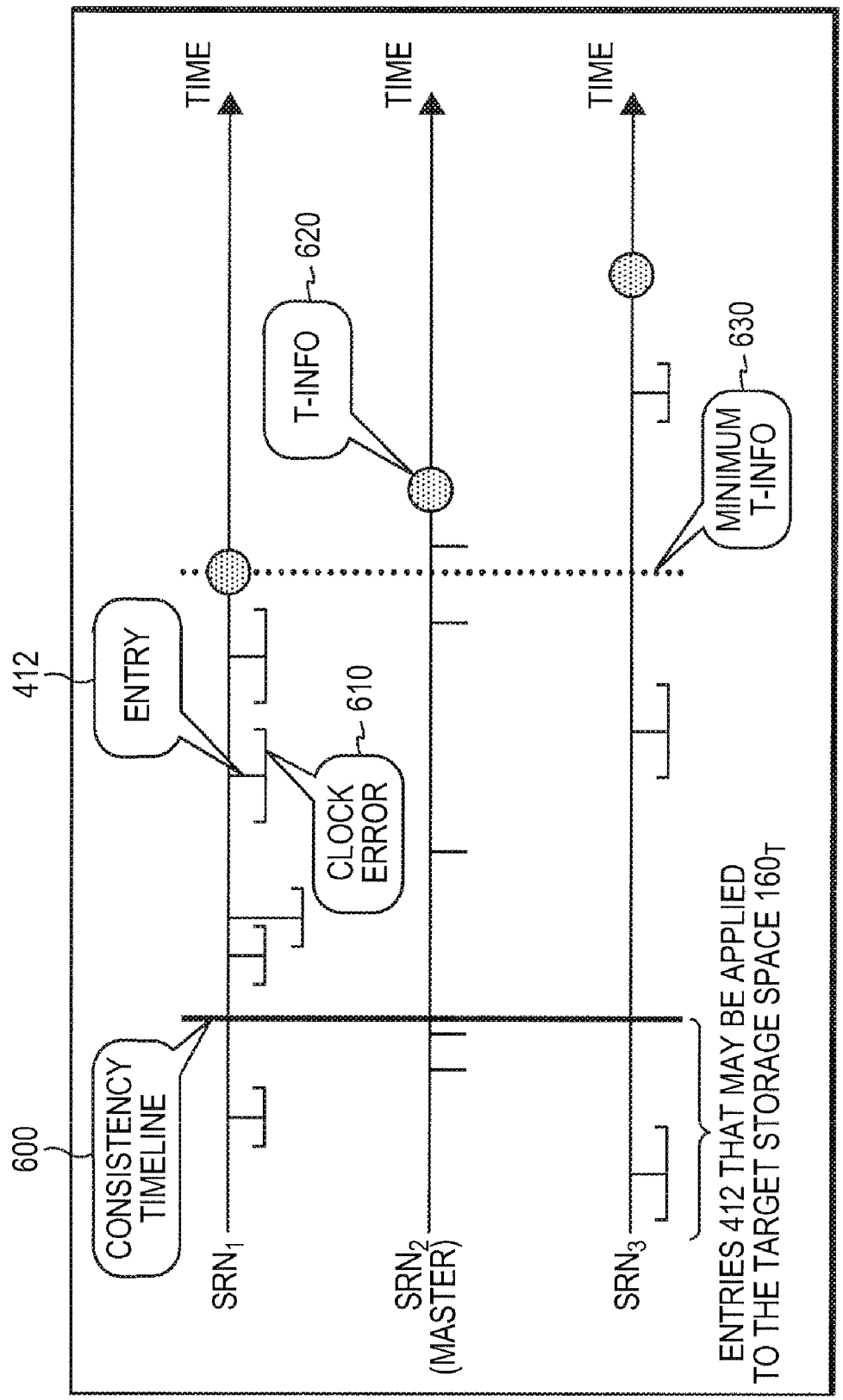
FIG. 6 is a chart depicting an illustrative embodiment of a consistency timeline that may be advantageously used with the present invention.

FIG. 6 is a chart depicting an illustrative embodiment of a consistency timeline 600 that may be advantageously used with the present invention. This figure shows entries received at the TRN 400 from write interception components of $SRN_{1-3}$, one of which is the master ($SRN_2$) at that point in time. As noted, the entries are buffered (logged) upon receipt at the TRN and illustratively organized as queues, wherein each queue contains the entries 412 (i.e., writes) sorted by their order of interception at the SRNs, from the perspective of the TRN. Note the order of the writes within each queue may be guaranteed by the SRN or, alternately, the SRN may send the writes in any order and the TRN may reorder them. The specific ordering implementation is not limiting to the invention. The vertical slashes on the timelines denote the times when the actual entries 412 (writes) occurred or, more specifically, the timestamps provided by the CNodes of the SRNs. In the case of the slave $SRN_{1,3}$, the write does not necessarily occur at a single point in time, but occurs within a time margin around the vertical slash that denotes the error boundary of its clock (i.e., clock error 610). However, writes generated by the master $SRN_2$ have no error boundary because, by definition, those writes have no errors, i.e., the master "owns" the time.

Consistency Engine

In an illustrative embodiment, the consistency engine 430 is configured to establish, maintain and advance the consistency timeline 600, e.g., from time to time. The consistency engine 430 establishes (calculates) the timeline using parameters such as T-info 620 and Minimum T-info 630. As used herein, T-info 620 is defined as a guarantee (e.g., from a point of view of the TRN) that all entries with times earlier than T-info have been propagated by the specific SRNs associated with the specific T-info, while Minimum T-info 630 is the T-info with the lowest (earliest) value. The consistency engine 430 calculates the consistency timeline 600 in a manner that does not cause any uncertainty driven by the error boundaries of the writes.

Specifically, the goal of the consistency engine 430 is to advance the consistency timeline 600 to the most, up-to-date point possible so that the apply engine 440 can apply the writes to the persistent target storage space $160_T$ up to the calculated consistency timeline. To that end, the consistency engine 430 frequently (e.g., every second, but alternately according to policy) calculates a new consistency timeline, if possible. Typically, the desired timeline is the latest calculated timeline possible. Illustratively, writes that occur earlier than the current consistency timeline (i.e., entries 412 located to the left of that consistency timeline) are allowed to be handled by the apply engine 440. The remaining entries 412 accumulate at the TRN log 410.

Figure 7:
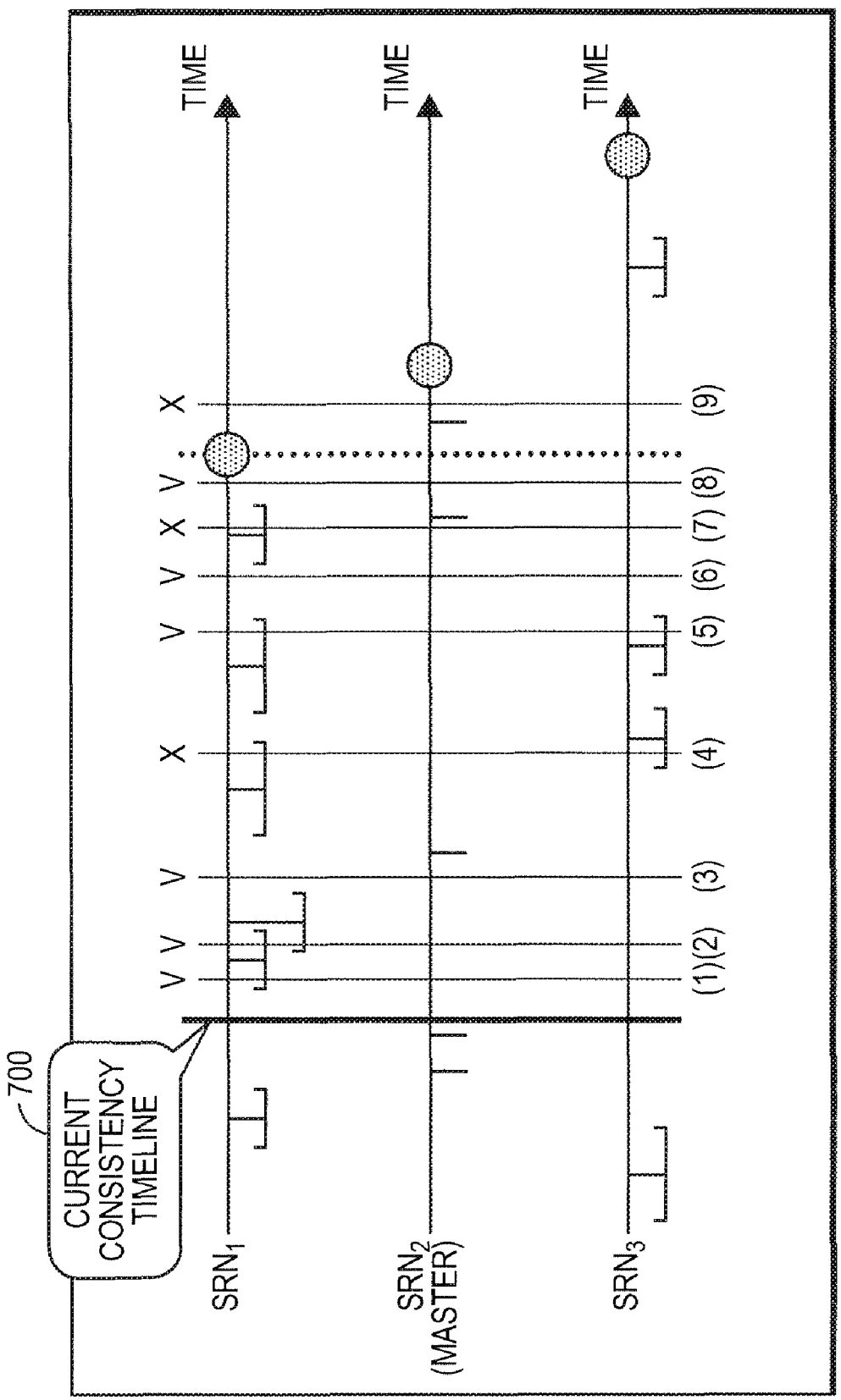
FIG. 7 is a chart depicting a set of rules used to determine the validity of consistency timeline values in accordance with the present invention.

FIG. 7 is a chart depicting a set of rules used to determine the validity of consistency timeline values in accordance with the present invention. More specifically, the rules for a valid consistency timeline $T_{NT}$ include (i) $T_{NT}$ must be higher than the current consistency 700 timeline, (ii) $T_{NT}$ must not be higher than the Minimum T-info 630, and (iii) there must not be two different entries 412 (writes) from two different SRNs: $W_1 = T_{W1} \pm E_{W1}$ and $W_2 = T_{W2} \pm E_{W2}$ where:

$T_{W1} \leq T_{NT} \leq T_{W1} + E_{W1}$

AND $[T_{W1} - E_{W1}, T_{W1} + E_{W1}]$ and $[T_{W2} - E_{W2}, T_{W2} + E_{W2}]$ overlap

AND $T_{NT} < T_{W2}$

In other words, if the consistency timeline crosses the "right part" of the error period of write W1 and there is a write W2 coming from a different SRN whose error period overlaps with that of W1, and W2 is "to the right" of the consistency timeline, then the timeline is invalid. In sum, the rules prevent two writes (entries 412) issued from two different SRNs with possible misinterpretation of their order (due to clock error 610) from being "judged" differently by the consistency timeline—either both writes are "in" or "out".

The current consistency timeline 700 is the timeline farthest to the left of the chart. The consistency engine 430 performs its function by advancing the consistency timeline from that position. Nine examples of possible new consistency timelines 1-9 are provided, along with explanations as to their validity (V) or invalidity (X), the latter signifying that such timelines are not established (drawn). Note that each possible consistency timeline is investigated independently of the others; in a practical situation involving the nine possible consistency timelines, the consistency engine 430 advances the consistency timeline to the most up-to date point possible which, in this practical case, would illustratively be timeline 8.

For example, consistency timeline 1 crosses the "left error part" of an entry (write) and nothing more. That is, the timeline crosses the write from $SRN_1$ to the left of the vertical slash. Therefore, timeline 1 is a valid consistency timeline and, thus, can be drawn by the consistency engine 430.

The consistency timeline 2 crosses the "right error part" of a first write from $SRN_1$ and there is a second overlapping write from $SRN_1$ that is to the right of the timeline 2. However, both writes are issued from the same SRN, and thus their mutual order is clear. Therefore, timeline 2 is a valid consistency timeline and can be drawn by the consistency engine 430.

The consistency timelines 3, 6 and 8 are valid because they do not cross any write operations.

The consistency timeline 4 crosses the "right error part" of a write from $SRN_1$ and there is a second overlapping write from a different SRN ($SRN_3$) whose time is to the right of the timeline 4, i.e., the vertical slash of $SRN_3$ is to the right of timeline 4. Therefore the timeline is invalid because the true order of those two writes is not clear.

Consistency timeline 5 is valid and comprises two overlapping writes from two $SRNs_{1,3}$ crossed by the consistency timeline. However, both writes are to the left of the consistency timeline 5 and thus are handled in a similar manner. Note that for consistency timeline 5, it does not matter which write occurred first, primarily because each issues from a different SRN and is presumably directed to a different storage space (i.e., this discussion herein assumes there is "no shared everything" between the SRN writes).

Consistency timeline 7 is invalid (similar to timeline 4) and is drawn to emphasize that even if one of the two writes does not have an error part (from master $SRN_2$), its zero (0) error part can still overlap with another write, such that the order between the two writes may be different, which would impact consistency.

Lastly, consistency timeline 9 is invalid because it is higher than the Minimum T-info 630.

Apply Engine

The apply engine 440 is configured to apply all writes (entries 412) below (i.e., to the left) or equal to the current consistency timeline 700 and then delete (erase) those entries 412 from the TRN log 410. That is, the apply engine 440 retrieves entries 412 from the queues 420 up to the current consistency timeline 700 and flushes (stores) them to the target storage space $160_T$. Concurrently, the consistently engine 430 advances the timeline to, e.g., consistency timeline 3, so that the apply engine can retrieve additional entries (up to the newly advanced current consistency timeline) and store them on the target storage space.

Assume the apply engine 440 is unable to complete storage of all entries 412 up to consistency timeline 3 because, e.g., the target storage space is slow responding to storage requests. Yet, the consistency engine 430 has advanced the current consistency is timeline to, e.g., timeline 5. According to the invention, the apply engine 440 may continue processing (storing) entries 412 up to the consistency timeline 5. In other words, the progress of the apply engine (and/or target storage) does not prevent the consistency engine from continuing to calculate new consistency timelines. The apply engine 440 may apply the entries (write data) in virtually any order. That is, the apply engine does not necessarily have to apply the write data in the order that is illustrated in FIG. 6. The apply engine 440 may change the order of writes to optimize writing to the target storage space $160_T$ as long as it does not reverse the order of two writes that address the same block.

Specifically, the apply engine 440 may apply the above writes to the target storage space $160_T$ in any order it wishes, with the following exception: if two writes, W1 and W2, are associated with overlapped storage space addresses, and are both below the current consistency timeline 700, then those writes must be applied in the "correct" time order. The motivation for this exception is that, if the two writes are directed to the same address and if their true order is altered/switched, then the result will be an old ("stale") content, rather than a desired new ("valid") content, leading to a corrupted image that is no longer a crash image. The above exception is simple to maintain and realize, as long as the SRNs 300 have shared-nothing relations to the storage space (meaning that two different SRNs cannot write to the same storage space address).

As noted, two writes from two separate SRNs that both overlap in their error periods and overlap in their storage space addresses are problematic from the apply engine perspective. This situation may not arise when the SRNs have shared-nothing relationships with the storage space. Yet even if the host applications 112 have shared-everything relationships, locating the SRNs in the switching fabric 140 and re-routing to the SRNs in a way that grants shared-nothing relations between the SRNs and the storage space obviates this problem.

In a shared-everything environment, if writes directed to the same address propagate from different SRNs and if it can be guaranteed that the TRN 400 concluded a correct order, there is no issue. However, there may be a situation where two writes overlap (from the TRN perspective) because of, e.g., clock error from the SRNs. As a result, the TRN is unable to determine which write was issued first. To solve this problem, the TRN 400 does not advance the timeline but instead instructs one of the SRNs 300 to read the data of the overlapping storage space address, stamping the time that read operation started and ended. That is, the TRN does not calculate a consistency timeline during the period from which it realized the overlapping writes to the point at which it receives the read.

Once the entry representing that read arrives at the TRN (denoted as read entry), the TRN can calculate the consistency timeline to a time later than the read entry's read end time, provided there is no overlapping write to that storage space address that took place concurrently to the read. This solves the overlapping write issue because the result of the read resolves the content of the address. If the process ended successfully and the new consistency timeline is set, the apply engine 440 applies the non-overlapping parts (if any) of the problematic entries and applies the read entry as well.

If the workload of writes is heavy enough, in a sustained manner, then there is a chance valid consistency timelines cannot be found, because all possible timelines cross writes with overlapped error periods in a way that renders the timelines invalid. That is, there may be situations in which the workload is so heavy that the TRN is unable to calculate a consistency timeline that does not introduce overlap among various SRNs. When this situation is detected, the SRNs are instructed to introduce a short quiescent period during which they hold off sending writes and during which there is no requirement for explicit coordination among the SRNs, e.g., every second they stop for 10 milliseconds. Note that the term "every second" is from each SRN perspective of the current time such that, although the SRNs do not explicitly coordinate during the quiescent period, there will be a point in "real" time at which all of the SRNs are quiesced, as long as the quiescent period is equal to or higher than the current clock errors of the SRNs. Therefore, the value "10 milliseconds" should be set according to the expected minimum clock error or even be adaptively changed over time according to observed clock errors in the system. Note also that the quiescent period introduces a window in time in which the TRN is guaranteed to calculate a consistency timeline without crossing any error boundaries, as long as the current clock errors in all SRNs are smaller than the quiescent period. From the perspective of the TRN, there is now a period of time where no writes cross so that the consistency engine 430 can create a new consistency timeline.

In an illustrative embodiment, the SRNs may be instructed to introduce the quiescent period in an adaptive manner. That is, the TRN may issue a checkpoint request message to each SRN that instructs the SRN to enter a checkpoint mode and execute operations for a predetermined period of time, e.g., 1 minute. The operations are illustratively "Checkpoint for time T" operations (i.e., checkpoints), wherein each SRN holds all writes that arrive in the time interval [T, T+X] (i.e., the Checkpoint Interval), and continues its processing at the end of the Checkpoint Interval. For example, every 1 second during the 1 minute period, each SRN performs a checkpoint for the interval [T, T+10 milliseconds] and, as such, each SRN performs approximately 60 checkpoints during the 1 minute period. Alternatively, the SRNs may introduce the quiescent period in a simple checkpoint manner such as, e.g., by executing a checkpoint policy periodically or at all times. Notably, this simple checkpoint feature does not require any exchange or interaction with the SRNs since the policy execution in each SRN ensures an exact alignment in time in which the SRNs hold off issuing writes.

There are situations, such as reboot or restart, where a slave CNode of a SRN 300 does not know the current time and, further, cannot connect with its master CNode. However, the write interception component 310 of the SRN 300 still intercepts writes issued from a source storage system 200$_S$. The write interception component cannot sample/record the timestamp for these intercepted writes, i.e., the writes cannot be time stamped, because the interception component 310 does not know the current time. The SRN is thus in a clock-loss state and the write interception component must compensate for this situation.

One approach used to solve this situation involves the write interception component 310 entering a bitmap mode to record a bitmap of the writes without recording the time stamp. Subsequently, when the SRN 300 is no longer in the clock-loss state, the write interception component resynchronizes the data by, e.g., reading from source volumes. Another approach is to record the entry, mark it as timeless and then propagate it to the TRN 400. When the SRN recovers from the clock-loss state, a special entry (or the next real entry) marks that the clock-loss state as over. The consistency engine 430 does not calculate a consistency timeline of a "time" that is inside a clock-loss state (i.e., inside the period between the last known time before the clock-loss state was entered and the next-known time after the clock-loss state was exited).

While there have been shown and described illustrative embodiments for providing a write ordering style asynchronous replication service that utilizes a loosely-accurate global clock in a data backup and recovery storage environment, it is to be understood that various other adaptations and modifications may be made within the spirit and scope of the present invention. For example, in an alternate embodiment, it may be possible to form a set of rules that appear different than the set described with respect to FIG. 7. For example, it may be possible to form a "weaker" mechanism that would invalidate some of the valid consistency timelines shown above. In addition, it is possible to form a set of rules wherein a new consistency timeline could be drawn only if it is higher than the current consistency timeline 700, lower than the Minimum T-info 630, and does not cross any error-part of any write. As a result, only consistency timelines 3, 6, and 8 would be valid. The invention applies to any/all of those variables. The foregoing description has been directed to specific embodiments of this invention. It will be apparent, however, that other variations and modifications may be made to the described embodiments, with the attainment of some or all of their advantages. For instance, it is expressly contemplated that the processes, modules and/or components described herein can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for providing a write ordering style asynchronous replication service, comprising:
    embodying a set of source storage systems as source replication nodes that cooperate to maintain a consistency group that spans multiple geographical sites, each source storage system comprising a first processor configured to execute a first storage operating system of at least one source storage system;
    embodying a target storage system as a target replication node configured to service the consistency group, the target storage system comprising a second processor configured to execute a second storage operating system of the target storage system;
    intercepting a storage request at a write interception component of a particular source replication node;
    recording the storage request at the particular source replication node;
    generating metadata for the storage request at the particular source replication node;
    assigning a value to the storage request according to a clock of the particular source replication node;
    propagating the storage request from the particular source replication node to the target replication node and storing the propagated storage request as a log entry of a plurality of log entries of the target replication node;
    establishing a consistency timeline value at the target replication node using a first predetermined parameter and a second predetermined parameter, wherein a first log entry of the plurality of log entries has an assigned value up to the consistency timeline value and a second log entry of the plurality of log entries has an assigned value greater than the consistency timeline value; and
    applying the first log entry to a storage space of the target replication node in response to the first log entry having the assigned value up to the consistency timeline value, wherein the second log entry having the assigned value greater than the consistency timeline value is not applied to the storage space.

2. The method of claim 1 wherein propagating further comprises:
    propagating the storage request as the log entry of a target replication node log from the particular source replication node to the target replication node for storage on the storage space.

3. The method of claim 1 wherein propagating further comprises:
    propagating each log entry to a target replication node log of the target replication node; and
    storing each log entry in the target replication node log.

4. The method of claim 1 further comprising:
    advancing the consistency timeline value by a consistency engine of the target replication node.

5. The method of claim 1 wherein the first and the second predetermined parameters comprise T-info and Minimum T-info parameters.

6. The method of claim 1 wherein applying the first log entry comprises applying the first log entry by an apply engine of the target replication node.

7. The method of claim 1 further comprising:
applying the first log entry up to the consistency timeline to create a crash image on the storage space of the target replication node.

8. The method of claim 1 further comprising:
basing a global clock of one of the source replication nodes on a timestamp and an associated error boundary.

9. A system configured to provide a write ordering style asynchronous replication service, comprising:
a set of source storage systems configured as source replication nodes that cooperate to maintain a consistency group that spans multiple geographical sites, each source storage system comprising a first processor configured to execute a first storage operating system of at least one source storage system;
a target storage system configured as a target replication node configured to service the consistency group, the target storage system comprising a second processor configured to execute a second storage operating system of the target storage system;
a write interception component of one or more source replication nodes configured to intercept a storage requests, and further configured to record the requests, and further configured to generate metadata for the requests;
the source replication nodes configured to assign a values to the storage requests, according to a clock of the source replication node that intercepted the storage request;
one or more entries of a log of target replication node configured to receive the storage request from the source replication node that intercepted the storage request;
a consistency timeline value at the target replication node using a first predetermined parameter and a second predetermined parameter, wherein a first log entry has an assigned value up to the consistency timeline value and a second log entry has an assigned value greater than the consistency timeline value; and
the target replication node further configured to apply the first log entry to a storage space of the target replication node in response to the first log entry having the assigned value up to the consistency timeline value, wherein the second log entry having the assigned value greater than the consistency timeline value is not applied to the storage space.

10. The system of claim 9 wherein the storage request comprises a write operation.

11. The system of claim 9 wherein the clock is comprises a global clock.

12. The system of claim 9 wherein the target replication node further comprises a consistency engine configured to establish, maintain and advance the consistency timeline value.

13. The system of claim 9 wherein the first and the second predetermined parameters comprise T-info and Minimum T-info parameters.

14. The system of claim 13 wherein the T-info is a guarantee that all storage requests have been propagated by each source replication node and wherein the Minimum T-info comprises the T-info with a lowest value.

15. The system of claim 9 wherein the target replication node further comprises an apply engine configured to apply any log entry to the storage space up to the consistency timeline value to create a crash image on the target storage space.

16. The system of claim 15 wherein the crash image comprises a storage image of the storage space of the target replication node that is available at restart from an interruption.

17. The system of claim 8 wherein the clock is based, at least in part, on a timestamp and an associated error boundary.

18. A computer--readable storage medium containing executable program instructions executed by a processor, comprising:
program instructions that embody a set of source storage systems as source replication nodes that cooperate to maintain a consistency group that spans multiple geographical sites, each source storage system comprising a first processor configured to execute a first storage operating system of at least one source storage system;
program instructions that embody a target storage system as a target replication nodes configured to service the consistency group, the target storage system comprising a second processor configured to execute a second storage operating system of the target storage system;
program instructions that intercept a storage request at a write interception component of a particular source replication node;
program instructions that record the storage request at the particular source replication node;
program instructions that generate metadata for the storage request at the particular source replication node;
program instructions that assign a value to the storage requests according to a clock of the particular source replication node;
program instructions that propagate the storage request from the particular source replication node to the target replication node and program instructions that store the storage request as a log entry of a plurality of log entries of the target replication node;
program instructions that establish a consistency timeline value at the target replication node using a first predetermined parameter and a second predetermined parameter, wherein a first log entry of the plurality of log entries has an assigned value up to the consistency timeline value and a second log entry of the plurality of log entries has an assigned value greater than the consistency timeline value; and
program instructions that apply the first log entry to a storage space of the target replication node in response to the first log entry having the assigned value up to the consistency timeline value, wherein the second log entry having the assigned value greater than the consistency timeline value are not applied to the storage space.

19. The computer--readable storage medium of claim 18 further comprising:
program instructions that base a global clock of one of the source replication nodes on a timestamp and an associated error boundary.

20. A system for providing a write ordering asynchronous replication service, comprising:
a set of source storage systems configured as source replication nodes (SRNs), the SRNs configured to cooperate to maintain a consistency group, each source storage system comprising a first processor configured to execute a first storage operating system of at least one source storage system;
a target storage systems configured to be embodied as a target replication nodes (TRN), the TRN configured to service the consistency group, each target storage system comprising a second processor configured to execute a second storage operating system of at least one target storage system;

a write interception component of a particular SRN configured to intercept a storage request directed to the consistency group and further configured to record the storage request, and further configured to generate and assign a timestamp value associated with a clock of the particular SRN to the storage request, wherein the timestamp value has a maximum error boundary;

the TRN further configured to receive the storage request with the timestamp and the, maximum error boundary propagated from the particular SRN;

a consistency engine of the TRN configured to establish a current consistency timeline value using a first predetermined parameter and a second predetermined parameter; and an apply engine of the TRN configured to apply storage request received from the particular SRN to a target storage space of the consistency group when the timestamp and the maximum error boundary of the storage request is earlier than the current consistency timeline value.

21. The system of claim 20 further comprising:
the consistency engine further configured to advance the consistency timeline value.

22. The system of claim 20 wherein the first and the second predetermined parameters are comprise T-info and Minimum T-info parameters.

23. The system of claim 20 further comprising a global clock of a master SRN configured to provide consistent replication of the target storage space, wherein the global clock has no error boundary.

24. The system of claim 20 further comprising:
the TRN further configured to receive a plurality of storage requests in a first order; and
the TRNs further configured to reorder the plurality of storage requests to be written in a second order.

25. The system of claim 20 further comprising:
one or more of the SRNs configured with a shared-everything relationship; and
the one or more of the SRNs configured with the shared-everything relationship configured to be re-routed to create a shared-nothing relationship instead of the shared-everything relationship.

26. The system of claim 20 further comprising:
one or more SRNs further configured to read data of an overlapping storage space address;

the one or more SRNs further configured to record a time that the data is read and when the data is finished being read; and
the consistency engine further configured to calculate another consistency timeline to a time later than when the data is finished being read.

27. The system of claim 20 further comprising:
introducing a quiescent period; and
one or more SRNs further configured to halt, sending at least one storage request to the TRN in response to the quiescent period.

28. A method for providing write ordering style asynchronous replication service, comprising:
embodying a set of source storage systems as source replication nodes (SRNs) that cooperate to maintain a consistency group, each source storage system comprising a first processor configured to execute a first storage operating system of at least one source storage system;
embodying a target storage system as a target replication node (TRN) configured to service the consistency group, the target storage system comprising a second processor configured to execute a second storage operating system of the target storage system;
intercepting a storage request directed to the consistency group at a write interception component of a particular SRN and recording the storage request;
generating by the write interception component a timestamp with a maximum error boundary of the timestamp associated with a clock of the particular SRN that intercepted the storage request;
propagating the storage request with the timestamp and the maximum error boundary from the particular SRN to the TRN;
establishing a current consistency timeline value at the TRN using a first parameter and a second parameter; and
applying the storage request propagated from the particular SRN to a target storage space of the TRN when the timestamp and the maximum error boundary of the storage request is earlier than the current consistency timeline value at the TRN.

29. The method of claim 28 further comprising:
basing a global clock of one of the SRNs on the timestamp and the associated error boundary.

30. The method of claim 28 further comprising:
a global clock of a master SRN configured to provide consistent replication of the target storage space of the consistency group, wherein the global clock has no error boundary.

* * * * *

UNITED STATES PATENT AND TRADEMARK OFFICE
CERTIFICATE OF CORRECTION

PATENT NO. : 7,925,629 B2  Page 1 of 2
APPLICATION NO. : 11/692668
DATED : April 12, 2011
INVENTOR(S) : Erez Webman et al.

It is certified that error appears in the above-identified patent and that said Letters Patent is hereby corrected as shown below:

In Col. 3, line 48 should read:
sive and generally not ~~is~~ deployable by systems running open, In Col. 11, line 45 should read:
current consistency ~~is~~ timeline to, e.g., consistency time- In Col. 15, line 29 should read:
~~requests~~request, and further configured to record the ~~requests~~ request, In Col. 15, lines 31-33 should read:
~~requests~~request;
the source replication nodes configured to assign a ~~values~~ value
to the storage ~~requests~~ request, according to a clock of the source In Col. 15, line 35 should read:
one or more entries of a log of the target replication node In Col. 15, line 53 should read:
11. The system of claim 9 wherein the block ~~is~~ comprises a In Col. 16, line 20 should read:
as a target replication ~~nodes~~ node configured to service the In Col. 16, line 32 should read:
~~requests~~ request according to a clock of the particular source In Col. 16, line 51 should read:
greater than the consistency timeline value ~~are~~ is not applied to Signed and Sealed this
Eighteenth Day of September, 2012

David J. Kappos
*Director of the United States Patent and Trademark Office*

CERTIFICATE OF CORRECTION (continued)
U.S. Pat. No. 7,925,629 B2

In Col. 16, line 67 should read:
    target replication ~~nodes~~ <u>node</u> (TRN), the TRN configured to In Col. 17, line 19 should read:
    an apply engine of the TRN configured to apply <u>the</u> storage